No. 653,919. Patented July 17, 1900.
A. DE LASKI.
WOVEN TUBULAR FABRIC.
(Application filed July 20, 1899.)
(No Model.)
Fig. 1,
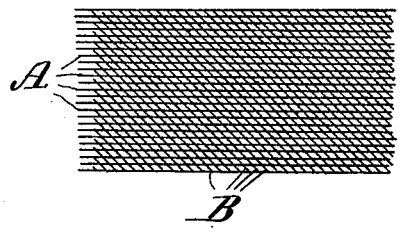
Fig. 2,
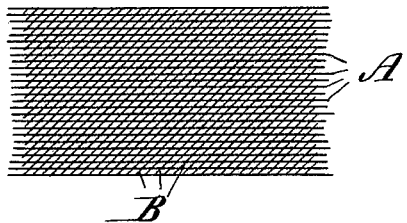
Fig. 3,
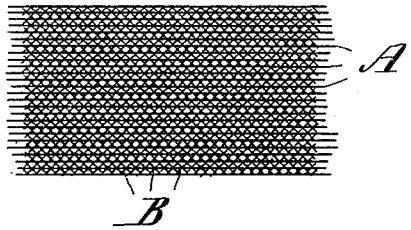
WITNESSES:
INVENTOR
Albert de Laski.
BY
HIS ATTORNEY

UNITED STATES PATENT OFFICE.

ALBERT DE LASKI, OF TRENTON, NEW JERSEY.

WOVEN TUBULAR FABRIC.

SPECIFICATION forming part of Letters Patent No. 653,919, dated July 17, 1900.

Application filed July 20, 1899. Serial No. 724,478. (No model.)

*To all whom it may concern:*

Be it known that I, ALBERT DE LASKI, a citizen of the United States, residing at Trenton, in the county of Mercer and State of New Jersey, have invented certain new and useful Improvements in Woven Tubular Fabrics, of which the following is a specification.

My invention relates to woven tubular fabrics designed for use more particularly for hydraulic purposes—as, for example, in mill and fire fabric and rubber hose.

I will describe a woven tubular fabric embodying my invention and then point out the novel features in a claim.

In the accompanying drawings, Figures 1 and 2 are views of portions of woven tubular fabrics embodying my invention. Fig. 3 is a view of a portion of a tube comprising a plurality of woven-fabric tubes, each of which embodies my invention. The several figures are conventionally shown—that is, the threads of the fabric are shown by straight lines and no attempt is made to show them interwoven.

Similar letters of reference designate corresponding parts in all of the figures.

I will premise that the tubular fabric herein described is woven flat and that any loom for weaving tubular fabrics—like those, for instance, employed in weaving linen hose-pipes, &c.—may be employed for weaving the fabric—that is, any loom of this kind the shuttle or shuttles of which move in an inclined or diagonal direction relatively to the longitudinal warp-threads.

A represents the warp-threads, and B the weft-threads. The weft-threads are inclined or diagonal, as shown, with regard to the warp-threads. The advantage of so having the weft-threads is that the tubular fabric is rendered more flexible and can be bent without wrinkling. In cases where one tubular fabric is placed within the other the weft-threads of the tubes will be at an angle to each other and will cross, as will be clearly seen from Fig. 3. The tube shown in Fig. 3 is made up from the tubes shown in Figs. 1 and 2. The same plan is followed when more than two tubes are employed. The advantage of having the weft-threads cross each other in a tube is that greater strength is obtained without necessarily increasing the weight thereof. Fabric tubes woven in this manner are adapted for rubber and fabric hose.

In the employment of this fabric in the manufacture of what is generally termed "rubber" hose as many of the fabric tubes may be employed as desired and according to what ply hose is to be made. In making the hose the fabric tubes are first treated with cement to insure their union when vulcanized and then drawn one within the other. The inner tube of rubber is then drawn in, having previously been coated with cement. The hose so formed is plugged or capped at both ends and inflated with air under pressure to render it stiff or rigid. The outside wrapper of rubber is then applied and smoothed. After this the hose is vulcanized in any of the well-known manners.

In the manufacture of fabric hose (rubber-lined) the adjacent fabric tubes may or may not be united by cement or rubber compounds, as desired. They are, however, lined and vulcanized in the same manner as above pointed out.

What I claim as my invention is—

The combination of a plurality of woven fabric tubes, each having warp-threads and weft-threads which are inclined or diagonal to the warp-threads, said tubes being arranged one within the other, and the weft-threads of one tube crossing the weft-threads of the adjacent tube.

In testimony whereof I have signed my name to this specification in the presence of two subscribing witnesses.

ALBERT DE LASKI.

Witnesses:
BENJN. NAAR,
J. E. HAWARTH.